United States Patent [19]

Kuwajima et al.

[11] Patent Number: 5,011,533
[45] Date of Patent: Apr. 30, 1991

[54] METALLIC PIGMENT COMPOSITION

[75] Inventors: Teruaki Kuwajima, Higashiosaka; Satoshi Nagahata, Suita; Akihiro Kanakura, Hirakata, all of Japan

[73] Assignee: Nippon Paint Co., Ltd., Osaka, Japan

[21] Appl. No.: 380,594

[22] Filed: Jun. 26, 1989

[30] Foreign Application Priority Data

Jun. 24, 1988 [JP] Japan .................. 63-157651

[51] Int. Cl.$^5$ .................. C09C 1/62
[52] U.S. Cl. .................. 106/404; 106/503
[58] Field of Search .................. 106/404, 503

[56] References Cited

U.S. PATENT DOCUMENTS

| | | | |
|---|---|---|---|
| 4,453,982 | 6/1984 | Wilfinger et al. | 106/404 |
| 4,565,716 | 1/1986 | Williams, Jr. et al. | 106/404 |
| 4,621,112 | 11/1986 | Backhouse et al. | 106/404 |
| 4,717,424 | 1/1988 | Wilfinger et al. | 106/404 |
| 4,808,231 | 2/1989 | Kondis et al. | 106/404 |

*Primary Examiner*—William R. Dixon, Jr.
*Assistant Examiner*—Willie J. Thompson
*Attorney, Agent, or Firm*—Wenderoth, Lind & Ponack

[57] ABSTRACT

A metallic pigment composition which comprises a metallic pigment and a phosphorus compound selected from the group consisting of a phosphite represented by the following formula (I)

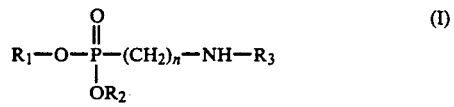

wherein $R_1$, $R_2$ and $R_3$, which are the same or different, represent a hydrogen atom, an alkyl group having 1 to 24 carbon atoms, a halogen-substituted alkyl group having 1 to 24 carbon atoms, an aryl group, a cycloalkyl group, an alkenyl group or an alkanol group, and n is an integer of 2 to 4, and a phosphobetain represented by the following formula (II)

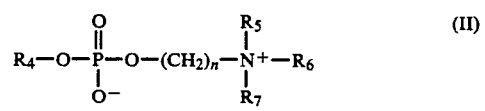

wherein $R_4$, $R_5$, and $R_6$ and $R_7$, which are the same or different, represent a hydrogen atom, an alkyl group having 1 to 24 carbon atoms, a halogen-substituted alkyl group having 1 to 24 carbon atoms, an aryl group, a cycloalkyl group, an alkenyl group or an alkanol group, n is the same as mentioned above.

6 Claims, No Drawings

METALLIC PIGMENT COMPOSITION

FIELD OF THE INVENTION

The present invention relates to a metallic pigment composition and a waterborne coating composition containing the same.

BACKGROUND OF THE INVENTION

It is known that metallic pigment, especially aluminum powder or aluminum flakes, is formulated into paint to provide metallic finishes. Most metallic paints are organic solvent type. Due to the problems of environmental pollution, waterborne paints are now proposed.

However, when a metallic pigment is incorporated into waterborne paint, the metallic pigment is reacted with water to generate hydrogen gas which is often associated with explosion danger. This problem is especially serious in the automotive industry in which paint is stored in a closed container for a long period of time before use.

In order to obviate this problem, it is proposed in Japanese Kokai Publication 168663/1983 that the metallic pigment is treated with a particular organic phosphate to make its surface hydrophobic. This method, however, often aggregates metallic pigments and adversely affects the smoothness and metallic appearance of the coating, thus deteriorating adhesive properties. These defects are improved by using a surfactant in a large amount, but it adversely affects water-resistance.

SUMMARY OF THE INVENTION

It has now been found that the above defects are obviated by treating a metallic pigment with a particular compound. Accordingly, the present invention provides a metallic pigment composition which comprises a metallic pigment and a phosphorus compound selected from the group consisting of a phosphite represented by the following formula:

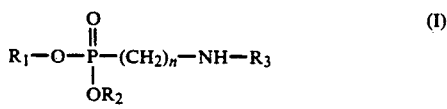

wherein $R_1$, $R_2$ and $R_3$, which are the same or different, represent a hydrogen atom, an alkyl group having 1 to 24 carbon atoms, a halogen-substituted alkyl group having 1 to 24 carbon atoms, an aryl group, a cycloalkyl group, an alkenyl group or an alkanol group, and n is an integer of 2 to 4, and a phosphobetain represented by the following formula:

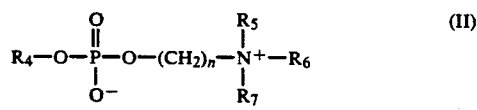

wherein $R_4$, $R_5$, $R_6$ and $R_7$, which are the same or different, represent a hydrogen atom, an alkyl group having 1 to 24 carbon atoms, a halogen-substituted alkyl group having 1 to 24 carbon atoms, an aryl group, a cycloalkyl group, an alkenyl group or an alkanol group, and n is the same as mentioned above.

The present invention also provides a waterborne coating composition which contains the above mentioned metallic pigment composition.

DETAILED DESCRIPTION OF THE INVENTION

Typical examples of the phosphites represented by the formula (I) are monooctyl 2-(dodecylamino)ethylphosphite, monostearyl 2-(n-butylamino)ethylphophite, mono(n-butyl) 2-(stearylamino)ethylphosphate, monooctyl 2-(4-hydroxybutylamino)ethylphosphite, mono(2-chloroethyl) 2-(octylamino)ethylphosphite, 2-(laurylamino)ethylphosphite and the like.

Typical examples of the phosphobetaines of the formula (II) are 2-laurylaminoethyl phosphate, 2-(dodecylaminoethyl) octyl phosphate, 2-[2-(hydroxyethyl)dimethylammonium]ethyl stearyl phosphate, 2-stearylaminoethyl butyl phosphate, 2-triethylammoniumethyl p-nonylphenyl phosphate, 2-(2,3-dihydroxypropylamino)ethyl octyl phosphate and the like. These compounds are prepared by known methods, for example a method wherein 1,3,2-dioxaphosphorane is ring-opened by amine, a method wherein an aminoalcohol is esterified with a phosphate, or a method wherein a vinyl phosphate is Michael-added by an amine.

The metallic pigment of the present invention can be aluminum, gold bronze, gold, iron, stainless steel, nickel, zinc, tin, chromium, lead, bismuth, an alloy thereof and the like. Preferred is aluminum. The metallic pigment is not limited in shape, but is preferably powder or flakes. More preferred are flakes.

The metallic pigment composition can be prepared with any methods wherein the pigment is contacted with the phosphorus compound. For example, the composition may be prepared by ball-milling metal with an organic solvent and a lubricant in the presence of the phosphorus compound of the present invention. Also, a metallic pigment paste, i.e. a paste of metal flakes, a solvent and the like, may be prepared by ball-milling in a known method and then mixed with the phosphorus compound. Further, after removing the organic solvent and the lubricant from the metallic pigment paste, the pigment is mixed with the phosphorus compound. Typical examples of the organic solvents employed in the production of the metallic pigment paste are mineral spirit, solvent naphtha and the like. Typical examples of the lubricants are unsaturated fatty acids, fatty acids, aliphatic amines and the like. The amount of the phosphorus compound can be varied depending upon many factors, but generally is within the range of 0.5 to 200 parts by weight, preferably 1 to 100 parts by weight based on 100 parts by weight of metal pigment only. Amounts of less than 0.5 part by weight deteriorate storage stability of the waterborne metallic paint, thus generating hydrogen gas. Amounts of more than 200 parts by weight can be used, but do not enhance technical effects in proportion to the increase of the amount.

The metallic pigment composition of the present invention is generally added to an aqueous coating composition. The waterborne coating composition contains a film-forming polymer which is well known in this field, for example an acrylic polymer which is soluble or dispersible in an aqueous medium. The film-forming polymer may be a condensation polymer, such as polyester or alkyd resin. The polymer may be neutralized with ammonia or amines if necessary. The waterborne coating composition may further contain the other components which are employed for an aqueous coating composition, for example a non-metallic pigment, a crosslinking agent, a thickening agent and a filler.

The waterborne metallic coating composition of the present invention is prepared by dispersing the metallic pigment composition mentioned above into a waterborne film-forming polymer solution. It can be coated on an article by a known method, such as spray coating, dip coating, electrocoating and the like. The metallic pigment of the present invention may be present in an amount up to 100% based on the amount of the film-forming polymer. The amount of the other components can be widely varied.

The waterborne metallic coating composition of the present invention does not generate hydrogen gas and the metallic pigment can stably be dispersed in the composition, because it is treated with the particular phosphorus compound.

The waterborne coating composition formulated with the metallic pigment of the present invention has good appearance property (metallic appearance, smooth surface) and good adhesion property and good water-resistance property.

EXAMPLES

The present invention is illustrated by the following Examples which, however, are not construed as limiting the invention to their details.

PRODUCTION EXAMPLE 1

A flask equipped with a stirrer and a thermometer was charged with 11 parts by weight of p-nonylphenol, 5.6 parts by weight of triethylamine and 120 parts by weight of tetrahydrofurane and cooled to -20° C. While keeping at −20° C., 7.8 parts by weight of 2-chloro-2-oxo-1,3,2-dioxaphosphorane was added dropwise. After the completion of the addition, stirring was continued for one hour with cooling, while triethylamine hydrochloride precipitated in the progress of a reaction of a hydroxyl group of p-nonylphenol with 2-chloro-2-oxo-1,3,2-dioxaphosphorane. After reacting at room temperature for another two hours, triethylamine hydrochloride was removed by filtering and tetrahydrofurane was then removed at a reduced pressure. The yield of the reaction was calculated from the amount of triethylamine hydrochloride to be 95%.

A pressure reaction vessel was charged with 18.7 parts by weight of the above reaction product, 10.2 parts by weight of laurylamine and 180 parts by weight of dimethylformamide, and reacted at 60° C. for 62 hours. The obtained compound was analyzed by NMR to find that a signal of methylene protons in phosphorane disappeared and a signal of methylene protons which were produced by a ring-opening of phosphorane appeared. According to IR spectrum, an absorption of $\nu_{p-o}$ was identified at 1,040 cm$^{-1}$ and an absorption of $\nu_{p=o}$ was identified at 1,240 cm$^{-1}$. Thus, the obtained compound was determined to be 2-laurylaminoethyl p-nonylphenyl phosphate.

PRODUCTION EXAMPLE 2

A flask equipped with a stirrer and a thermometer was charged with 93 parts by weight of laurylamine and 93 parts by weight of ethyleneglycol monoethyl ether, and heated to 80° C. Then, 117 parts by weight of bis-chloroethylvinylphosphonate (available from Daihachi Chemical Company as Vini Eight R) was added dropwise for 30 minutes and reacted for 3 hours. After cooling, 300 parts by weight of a 10% sodium hydroxide aqueous solution was added and kept at 100° C. for 2 hours to hydrolyze. The resultant solution was condensed and 500 parts by weight of water and 500 parts by weight of toluene were added. The solution was then neutralized with a 10% hydrochloric acid aqueous solution. The organic solvent layer was condensed to obtain 168 parts by weight of 2-laurylaminoethylphosphonic acid mono-2-(chloroethyl) ester.

EXAMPLE 1

Ten parts by weight of the phosphorus compound of Production Example 1 was dissolved in 300 parts by weight of acetone, in which 75 parts by weight of an aluminum pigment paste of aluminum content 65% (available from Asahi Kasei Co., Ltd. as MC-666) was dispersed. After mixing at room temperature for one hour, the obtained slurry was condensed to form an aluminum pigment composition of aluminum content 65%.

EXAMPLE 2

An aluminum pigment composition was prepared as generally described in Example 1, with the exception that the phosphorus compound of Production Example 2 was employed instead of that of Production Example 1.

PRODUCTION EXAMPLE 3

Preparation of a Resin for a Metallic Paint

A one liter reaction vessel equipped with a stirrer, a thermoregulator and a condenser was charged with 76 parts by weight of ethyleneglycol monobutyl ether, to which 60 parts by weight of a monomer solution, which contained 45 parts by weight of styrene, 63 parts by weight of methyl methacrylate, 48 parts by weight of 2-hydroxyethyl methacrylate, 117 parts by weight of n-butyl acrylate, 27 parts by weight of methacrylic acid and 3 parts by weight of azobisisobutylonitrile, was added and heated to 120° C. After adding another 245 parts by weight of the monomer solution for 3 hours, it was stirred for one hour. Then, 28 parts by weight of dimethylethanolamine and 200 parts by weight of deionized water were added to obtain an acryl resin varnish of volatile content 50% and number average molecular weight 12,000. The resin had an OH value of 70 and an acid value of 58.

EXAMPLE 3

140 parts by weight of the resin varnish of Production Example 3 was mixed with 30 parts by weight of Cymel 303 (methoxylated methylolmelamine available from Mitsui Toatsu Chemicals Co., Ltd.). It was then mixed with 10 parts by weight of the aluminum pigment composition of Example 1 and diluted with deionized water to 25 to 30 seconds (20° C.) of No. 4 Ford Cup to form a waterborne metallic coating composition. The composition was stored at 40° C. for one month, but no change was seen.

EXAMPLE 4

A metallic aqueous coating composition was prepared as generally described in Example 3, with the exception that the aluminum pigment composition of Example 2 was employed instead of that of Example 1. The composition was stored at 40° C. for one month, but no change was seen.

PRODUCTION EXAMPLE 4

Preparation of a Clear Paint

A resin was prepared as generally described in Production Example 3 from 65.8 parts by weight of n-butyl acrylate, 11.8 parts by weight of methyl methacrylate, 16.2 parts by weight of 2-hydroxyethyl methacrylate, 6.1 parts by weight of methacrylic acid and 5 parts by weight of azobisisobutylonitrile, and butyl diglycol as a solvent. The obtained resin was neutralized 100% with dimethylethanolamine. The resin had an OH value of 70 and an acid value of 40.

The obtained resin varnish was mixed with Cymel 303 in a ratio of 70/30 solid and then diluted with deionized water to 30 to 35 seconds (20° C.) of No. 4 Ford Cup to obtain a waterborne clear paint.

EXAMPLE A

A degreased polished steel panel was coated with an electrocoating paint for automobiles and baked. The panel was then coated with an intermediate paint and baked to form an intermediate-coated steel panel. The intermediate-coated steel panel was coated with the metallic coating composition of Example 3 in a dried film thickness of 20 micron, and then coated with the clear paint of Production Example 4 in a dried film thickness of 30 micron, using an air spray at a temperature of 23° C. and a relative humidity of 60%. The metallic coating composition was coated in two stages and 1 minute interval and dried for 5 minutes. Thereafter, the clear paint was coated one stage and then set for 7 minutes. The coated panel was baked at 150° C. for 20 minutes to form a test panel. Adhesion and water resistance of the coating were evaluated and the result is shown in Table 1.

EXAMPLE B

The same test as Example A was conducted for the metallic coating composition of Example 4 and the result is shown in Table 1.

COMPARATIVE EXAMPLE A

An aluminum pigment composition was prepared as generally described in Example 1, with the exception that 10 parts by weight of laurylphosphate was employed instead of the phosphorus compound of Production Example 1. A metallic coating composition was prepared as generally described in Example 3 and the same test was conducted as generally described in Example A. The result is shown in Table 1.

TABLE 1

| Example | Adhesion[1] | Water-resistance[2] |
| --- | --- | --- |
| 1 | Good | Good |
| 2 | Good | Good |
| Comparative Ex. | Bad | Bad |

TABLE 1-continued

| Example | Adhesion[1] | Water-resistance[2] |
| --- | --- | --- |
| 1 | | |

[1]The coated surface was cross-cut with a cutter knife and an adhesive tape was adhered to it. The tape was then peeled off. Good shows no peeling of the coating and bad shows peeling of the coating.
[2]The coated panel was dipped in a warm water at 50° C. for 10 days and then the change of the coating (gloss-down and/or discolor) was evaluated by eye. Good shows no change and bad shows some changes.
NOTE: In Examples 3 and 4, no gas generates after storing for three months at 40° C.

What is claimed is:

1. A metallic pigment composition comprising a metallic pigment and a phosphorus compound selected from the group consisting of a phosphite represented by the following formula (I);

$$R_1-O-\underset{\underset{OR_2}{|}}{\overset{\overset{O}{\|}}{P}}-(CH_2)_n-NH-R_3 \quad (I)$$

wherein $R_1$, $R_2$ and $R_3$, which are the same or different, represent a hydrogen atom, an alkyl group having 1 to 24 carbon atoms, a halogen-substituted alkyl group having 1 to 24 carbon atoms, an aryl group, a cycloalkyl group, an alkenyl group or an alkanol group, and n is an integer of 2 to 4, and a phosphobetain represented by the following formula (II);

$$R_4-O-\underset{\underset{O^-}{|}}{\overset{\overset{O}{\|}}{P}}-O-(CH_2)_n-\underset{\underset{R_7}{|}}{\overset{\overset{R_5}{|}}{N^+}}-R_6 \quad (II)$$

wherein $R_4$, $R_5$, $R_6$ and $R_7$, which are the same or different, represent a hydrogen atom, an alkyl group having 1 to 24 carbon atoms, a halogen-substituted alkyl group having 1 to 24 carbon atoms, an aryl group, a cycloalkyl group, an alkenyl group or an alkanol group, n is the same as mentioned above.

2. The metallic pigment composition according to claim 1 wherein the phosphite (I) is monooctyl 2-(dodecylamino)ethylphosphite, monostearyl 2-(n-butylamino)ethylphophite, mono(n-butyl) 2-(stearylamino)ethylphosphite, monooctyl 2-(4-hydroxybutylamino)ethylphosphite, mono(2-chloroethyl) 2-(octylamino)ethylphosphite or 2-(laurylamino)ethylphosphite.

3. The metallic pigment composition according to claim 1 wherein the phosphobetains (II) is 2-laurylaminoethyl phosphate, 2-(dodecylaminoethyl) octyl phosphate, 2-[2-(hydroxyethyl)dimethylammonium]ethyl stearyl phosphate, 2-stearylaminoethyl butyl phosphate, 2-triethylammoniummethyl p-nonylphenyl phosphate or 2-(2,3-dihydroxypropylamino)ethyl octyl phosphate.

4. The metallic pigment composition according to claim 1 wherein the metallic pigment is an aluminum pigment.

5. The metallic pigment composition according to claim 1 wherein the amount of the phosphorus compound is within the range of 0.5 to 200 parts by weight based on 100 parts by weight of metal pigment only.

6. A waterborne coating composition containing the metallic pigment composition according to any one of claims 1 to 5.

* * * * *